UNITED STATES PATENT OFFICE.

CHARLES F. CROSS AND EDWARD J. BEVAN, OF LONDON, ENGLAND.

MANUFACTURE OF CELLULOSE ACETATE.

SPECIFICATION forming part of Letters Patent No. 530,826, dated December 11, 1894.

Application filed June 4, 1894. Serial No. 513,466. (Specimens.)

*To all whom it may concern:*

Be it known that we, CHARLES FREDERICK CROSS and EDWARD JOHN BEVAN, citizens of England, residing at 4 New Court, Carey Street, in the city of London, England, have invented a new and useful Manufacture of Cellulose Acetate, of which the following is a specification.

This invention relates to the manufacture of cellulose acetate from a certain intermediate product, consisting of cellulose and zinc acetate in a state of combination or of intimate mixture.

To prepare this intermediate product we take cellulose in one of its hydrated forms which, as is well known, can be obtained by precipitation from the solution of cellulose in zinc chlorid or cuprammonium solutions, or from the solution obtained by treatment of crude cellulose with caustic alkali and carbon disulphid, as described in the specification of the British Patent No. 8,700 of 1892. The cellulose hydrate obtained in any of the above ways is added to and thoroughly mixed with a concentrated solution of zinc acetate in the proportion of from one to two equivalents of zinc acetate to one equivalent of the cellulose—that is to say about one hundred and fifty parts by weight of the crystallized zinc acetate (weighed before solution) to one hundred parts by weight of the dry cellulose contained in the cellulose hydrate. The mixture, after thorough incorporation of its ingredients, is dried and then dehydrated by heating it to 110° centigrade. The dry dehydrated substance is the intermediate product which is employed, according to this invention, for the manufacture of cellulose acetate. For this purpose, it is finely powdered and carefully mixed by successive doses with a definite quantity of acetyl chlorid, the mixture being stirred and cooled so that the temperature is kept below 30° centigrade until the whole of the acetyl chlorid is added; the quantity taken being calculated at two molecular equivalents (that is $2.C_2H_3O.Cl$) to one equivalent of the zinc acetate—that is $[Zn(OC_2H_3O)_2]$ in the intermediate product. The agitation is continued until the reaction is completed, care being taken to prevent the temperature from rising above 50° centigrade. The product of the reaction is treated with water to remove such zinc salts as may be present, and after thorough washing is pressed and dried. In order to separate residues of unattached cellulose from the cellulose acetate, the dried product is treated with solvents, such as chloroform, which dissolve the cellulose acetate but not the cellulose itself.

The solution of cellulose acetate is filtered or clarified by long standing and the solution filtered or poured off from the insoluble matter may then be used.

The acetyl chlorid used in the process may be diluted with chloroform or ethyl acetate (free from water and alcohol) in order to moderate the reaction and the resulting temperature.

The product closely resembles the cellulose nitrates in physical properties but of course from its constitution is non-explosive. From its solution in chloroform it is obtained in transparent films or sheets according to the thickness of the layers evaporated. Hence it may be used as a substitute for collodion in many applications, such as surgical work, to supply a temporary and artificial skin or in closing down bandages; also as a varnish in special cases where collodion varnish is now used. The product itself is of course solid and takes various forms, according to the way in which it is prepared. It may be obtained in lumps, or as described, viz: in transparent sheets and films. It also has the property of mixing or combining with oils in suitable solvents of both. It holds the oils in such a way as to give films of much softer texture without any loss of transparency and only a slightly diminished luster.

Having thus described the nature of this invention and the best means we know of carrying the same into practical effect, we claim—

1. The manufacture of an intermediate product consisting of cellulose and zinc acetate by mixing cellulose hydrate with zinc acetate solution, drying and dehydrating the compound, substantially as described.

2. The manufacture of cellulose acetate, by treating with acetyl chlorid the intermediate product manufactured by mixing cellulose hydrate with zinc acetate solution, drying and dehydrating; washing the crude product of the reaction, pressing and drying, treating the dried substance with chloroform whereby a solution of cellulose acetate is obtained free from cellulose, and finally, evaporating the solvent, substantially as described.

In testimony whereof we have signed our name to this specification, in the presence of two subscribing witnesses, this 22d day of May, A. D. 1894.

CHARLES F. CROSS.
EDWARD J. BEVAN.

Witnesses:
JNO. P. M. MILLARD,
Clerk to Messrs. Abel & Imray, Consulting Engineers and Patent Agents, 28 Southampton Buildings, London, W. C.
T. T. BARNES,
17 Gracechurch Street, London, E. C.